Figure 1:
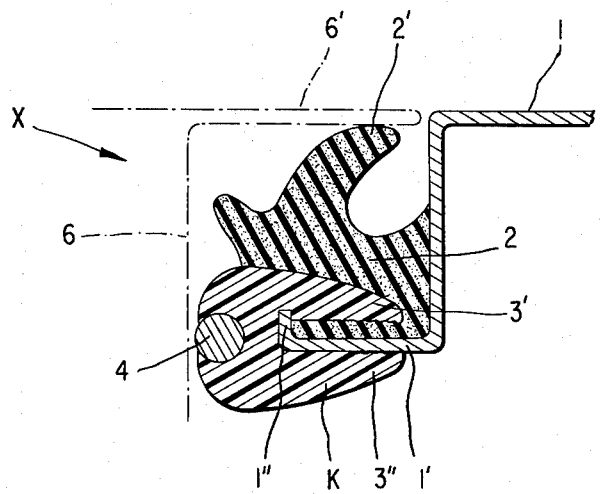

Oct. 3, 1961     W. HOFMEISTER     3,002,783

SEALS AND SECURING ARRANGEMENT THEREFOR

Filed Oct. 10, 1958

INVENTOR
WILHELM HOFMEISTER

BY *Dicke and Craig*
ATTORNEYS

United States Patent Office 3,002,783
Patented Oct. 3, 1961

3,002,783
SEALS AND SECURING ARRANGEMENT THEREFOR
Wilhelm Hofmeister, Munich, Germany, assignor to Bayerische Motoren Werke Aktiengesellschaft, Munich, Germany
Filed Oct. 10, 1958, Ser. No. 766,529
Claims priority, application Germany Oct. 29, 1957
8 Claims. (Cl. 296—44)

The present invention relates to a securing or fastening arrangement for the sealing structures used in connection with windows, doors, lids or hoods and similar foldable or pivotal parts in motor vehicles, whereby the seal consists of an elastic molding, band, strip or border of appropriate profile or cross section corresponding to the particular utilization purposes and circumstances and which is arranged or secured at a vehicle body sheet-metal part or the like.

The prior art types of sealing arrangements made of elastic material which are normally used in vehicle body constructions, such as sealing strips, moldings and bands, decorative strips, decorative insert members and similar structural parts exist in a very large variety of types and forms.

In numerous instances, rubber strips of appropriate cross-section are used in the prior art which are simply glued or cemented to the respective vehicle body sheet-metal part by means of any suitable cement, adhesive or the like, or which are wedged into the profile of the vehicle body sheet-metal part and are glued or cemented therein.

With such a prior art fastening or securing arrangement, there exists the disadvaneage which cannot be underestimated, that the cementing or gluing begins to become loose or detached, in due course, usually already after a relatively short time, so that the sealing molding or strip has to be re-cemented or re-glued to the vehicle body part. By reason of these disadvantages, it has also been proposed already in the prior art not only to use cementing or gluing in connection with the sealing molding or strip but to secure the same additionally by appropriate securing or fastening means such as clamps or rivets. Such a construction, however, is relatively costly, as may be readily understood, which is to be avoided as much as possible in regard to the mass production in automobile vehicle constructions and assemblies.

Furthermore, a door sealing arrangement is known in the prior art which consists of an elastic, however relatively stiff or rigid material, such as, for instance, of plastic synthetic material, and which is constructed as a clamping member slotted on both sides thereof, the clamping jaws of which surround or are emplaced in a jaw-like or clamp-like manner over the sheet-metal parts made of T-shaped profile and welded together, whereas the two oppositely directed shorter jaws thereof are spread apart by an expansion or spreading insert member. This type of sealing arrangement, however, is disadvantageous since, from a general point of view, a relatively "elastically stiff" sealing molding or strip which is a prerequisite for this type of prior art arrangement is not as good and does not seal as well as a seal made of relatively "soft" material.

In order to avoid the aforementioned disadvantages, the present invention proposes a clamping body member slotted on both sides thereof and adapted to be spread apart or expanded for purposes of securing the sealing structure used in connection with windows, doors, lids or hoods and similar pivotal or movable parts in motor vehicles which may be in the form of a sealing molding or strip arranged at the sheet-metal body part of the vehicle and of appropriate cross section, whereby the elasticity of the clamping member is less, preferably considerably smaller than that of the sealing molding or strip itself, and whereby, for example, one of the clamping lip portions engages in a recess of the sealing strip or molding, preferably consisting of soft foam rubber, whereas the other lip portion presses with the inner surface thereof against the sheet-metal body part and the clamping effect takes place, in a manner known per se, by an appropriate expansion member inserted between the spreading jaw portions of the clamping member.

Accordingly, the present invention distinguishes itself by the combination, on the one hand, of a relatively soft sealing member, of known construction such as a sealing strip or molding which itself takes over the sealing function in a most favorable manner and, on the other hand, of an element serving for purposes of securing the sealing member which in turn assures a simple, inexpensive and safe securing or fastening of the sealing member and additionally functions as decorative strip or ledge member.

Accordingly, it is an object of the present invention to provide a sealing arrangement for pivotal or movable parts, especially in mass produced vehicles which assures effective sealing while at the same time reducing the cost of manufacturing and installation thereof.

Another object of the present invention is the provision of a sealing arrangement for doors, hoods, windows, lids and the like in motor vehicles in which a relatively soft sealing member, for instance, a molding or strip, preferably made of soft foam rubber, is used to perform the sealing function, while a clamping member of relatively harder or stiffer elastic material is used to secure the sealing member to the relatively stationary vehicle part such as a sheet-metal body part.

Another object of the present invention resides in the provision of a sealing arrangement which obviates the disadvantages of the prior art, particularly as to the requirement of re-cementing or re-gluing the sealing members within a relatively short time after the initial installation thereof.

Figure 2:
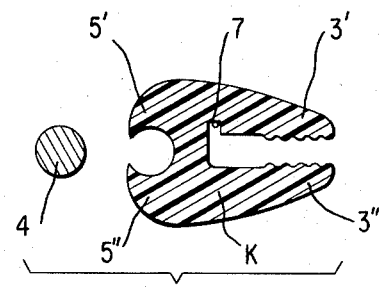

These and further objects, features and advantages of the present invention will become more obvious from the following description when taken in connection with the accompanying drawing which shows, for purposes of illustration only, one embodiment in accordance with the present invention, and wherein:

FIGURE 1 is a cross sectional view through the securing arrangement for a door seal and a sheet-metal body part in accordance with the present invention, and FIGURE 2 is a cross sectional view, similar to FIGURE 1, showing only the securing element and an insert element adapted to be inserted in the securing element.

Referring now to the drawing, wherein like reference numerals are used throughout the two views to designate like parts, reference numeral 1 designates the sheet-metal body part having an angularly bent portion 1'. A sealing member 2 such as a sealing strip or molding made of relatively soft material, for example, of soft foam rubber, which may be of any suitable appropriate cross section, is inserted into the angularly bent portion 1' of the sheet-metal part and is retained therein in the assembled position at the vehicle sheet-metal part, as shown in the drawing, by a securing element K. The sealing member 2 may be additionally secured at the sheet-metal body part 1 and 1' by gluing, cementing or similar adhesive means.

The securing element K, illustrated in detail in FIGURE 2, consists of a substantially relatively harder or stiffer material, for example, of a plastic synthetic material of any suitable type and is constructed as clamping member. The clamping lip portion 3' of clamping element K thereby engages in a recess provided in the sealing member 2, and the other clamping lip portion 3" presses against the sheet-metal body member 1'.

One or both of the lip portions 3' and 3" may be provided with a suitable profile or cross section in the transverse direction thereof, for example, a serrated cross section to increase the clamping action.

In the illustrated embodiment both the lip portion 3' and the lip portion 3" are provided with serrated cross sections.

The spreading effect or action which in turn is transformed into a clamping action of lip portions 3' and 3" is produced by means of an expansion insert member 4 which is inserted between the two spreading jaw portions 5' and 5" of the clamping member K. The vehicle door is schematically indicated by reference numeral 6, the flange 6' of which abuts during closure in the direction of the arrow X against a lip portion 2' of the sealing member 2 made of corresponding appropriate profile or cross section. Appropriately, a recess 7 may be provided within the clamping member K into which engages the angularly-bent end portion 1" of the body sheet-metal part 1.

The clamping member K, the expansion insert member 4 and the sealing member 2 may also be made of different color to impart a decorative appearance to the vehicle.

While I have shown and described one preferred embodiment in accordance with the present invention, it is understood that the same is not limited thereto but is susceptible of many changes and modifications within the spirit and scope of the present invention, and I, therefore, do not wish to be limited to the details illustrated herein but intend to cover all such changes and modifications as are encompassed by the scope of the appended claims.

I claim:
1. A sealing arrangement used with windows, doors, lids or hoods and similar pivotal or movable parts in motor vehicles having sheet-metal means, comprising elastic sealing means including an elastic lip portion adapted to elastically engage the above-mentioned movable parts at least in a closed position thereof, elastic clamping means made of a material having a lesser elasticity than said sealing means for securing the latter to said sheet-metal means, said clamping means including two clamping lip portions and two spreading-jaw portions, one of said clamping lip portions engaging said sealing means and the other of said clamping lip portions pressing against said sheet-metal means with the inner surface thereof, and insert means placed between said spreading jaw portions for spreading the latter apart and thereby forcing said other clamping lip portion against said sheet-metal means.

2. A sealing arrangement according to claim 1, wherein the inner surface of at least one of said clamping lip portions is provided with a transverse cross section adapted to increase the securing action thereof of said clamping lip portions.

3. A sealing arrangement according to claim 1, wherein at least one of said clamping lip portions is provided with a serrated cross section on the inner side thereof.

4. A sealing arrangement according to claim 3, wherein said other lip portion is provided with a serrated cross section.

5. A sealing arrangement according to claim 4, wherein both lip portions are provided with serrated cross sections.

6. A sealing arrangement according to claim 1, wherein said sealing means is additionally secured to said sheet metal means by cementing.

7. A sealing arrangement used with windows, doors, lids or hoods and similar pivotal or movable parts in motor vehicles having sheet-metal means, comprising elastic sealing means provided with a recess, clamping means made of an elastic material having a lesser elasticity than said sealing means for securing the latter to said sheet-metal means, said clamping means including two clamping lip portions and two spreading-jaw portions, one of said clamping lip portions engaging said recess in said sealing means and the other of said clamping lip portions pressing against said sheet-metal means with the inner surface thereof, and insert means placed between said spreading-jaw portions for spreading the latter apart and thereby forcing said other clamping lip portion against said sheet-metal means.

8. A sealing arrangement according to claim 7, wherein said clamping means is provided with an internal recess on the inside thereof, wherein said sheet metal means is provided with an end portion engaging in said recess.

References Cited in the file of this patent
UNITED STATES PATENTS

| | | |
|---|---|---|
| 2,569,955 | Schassberger | Oct. 2, 1951 |
| 2,794,218 | Ramsay | June 4, 1957 |

FOREIGN PATENTS

| | | |
|---|---|---|
| 630,827 | Great Britain | Oct. 21, 1949 |